Jan. 26, 1937.  O. BAUMGARTNER  2,068,787
CARBURETOR FOR INTERNAL COMBUSTION ENGINES ASSUMING VARIOUS ANGLES
Filed Jan. 7, 1936
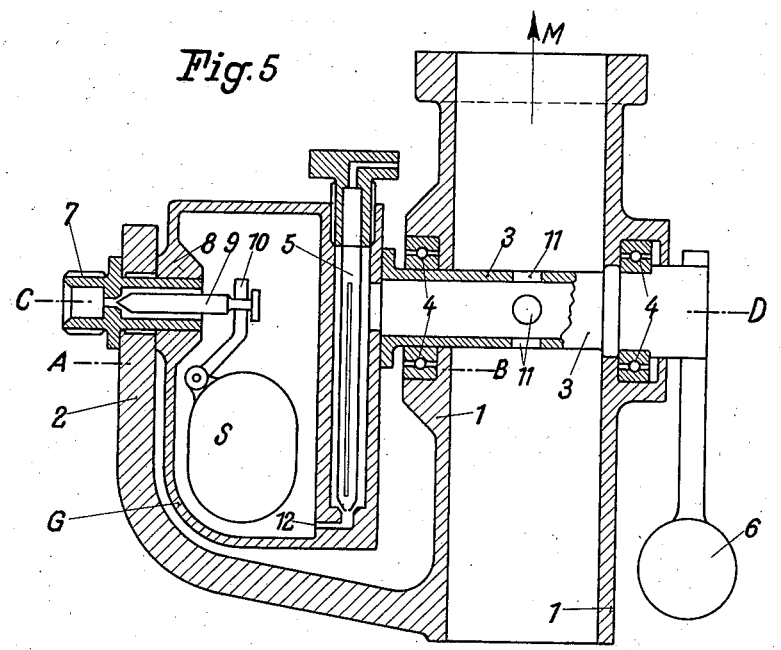
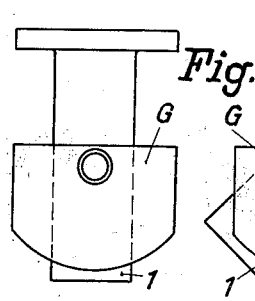
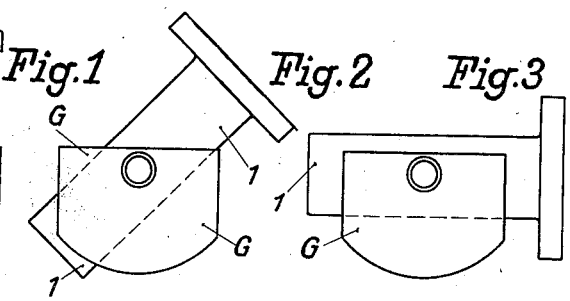
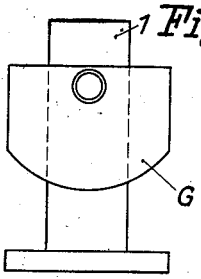
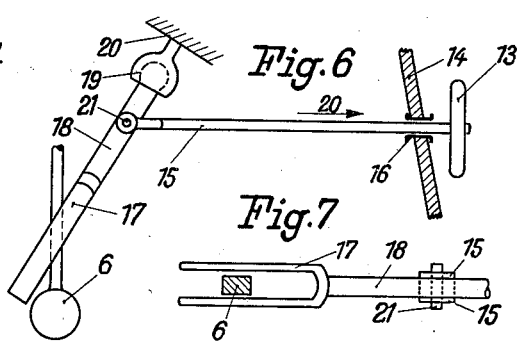
Inventor:
Otto Baumgartner Patented Jan. 26, 1937

2,068,787

UNITED STATES PATENT OFFICE 2,068,787

CARBURETOR FOR INTERNAL COMBUSTION ENGINES ASSUMING VARIOUS ANGLES

Otto Baumgartner, Bern-Bumpliz, Switzerland

Application January 7, 1936, Serial No. 57,954
In Switzerland January 22, 1935

2 Claims. (Cl. 261—72)

This invention relates to carburetors for internal combustion engines and more particularly for aircraft engines, and has for its object to provide a carburetor in which the fuel is automatically maintained at the correct level in the float chamber despite the various angles assumed by an aircraft during flight.

In order to maintain a constant fuel supply to aircraft engines, particularly in fighting machines and those used for carrying out acrobatics, it has hitherto been necessary to provide the carburetor with a double float chamber or to provide a floatless carburetor, both of which arrangements are open to certain objections.

The carburetor according to the present invention is provided with a float chamber which is rotatable relative to the induction pipe under the influence of a counter weight and is characterized in that the float chamber is rigidly connected to one end of a hollow axle through which the fuel mixture is fed and which is rotatably mounted in the induction pipe, said axle being provided with outlet apertures through which the mixture passes into the induction pipe and having a pendulum weight mounted on its end opposite the float chamber.

In order that the invention may be more clearly understood one particular construction thereof will now be described, by way of example, with reference to the accompanying drawing wherein:—

Fig. 1 shows the relative positions of the float chamber and the induction pipe in normal position, Fig. 2 shows the relative positions of the two parts when the aircraft descends or ascends, Fig. 3 shows the relative positions of the two parts when the aircraft is in a vertical position, Fig. 4 shows the relative positions of the two parts when the aircraft is upside down, Fig. 5 is a vertical section through the carburetor and the connecting pipes, Fig. 6 shows a device for turning and fixing the float chamber, and Fig. 7 is a detail of Fig. 6 in plan.

Referring to the drawing the float chamber G is rigidly connected to one end of an axle 3 which is rotatably mounted in ball or roller bearings 4 in the walls 1 of the induction pipe M. The axle 3 is hollow and is provided with apertures 11 through which the mixture passes, from the fuel nozzle chamber 5, into the induction pipe. On the end of the axle 3 opposite the float chamber G is mounted a pendulum weight 6 which maintains said float chamber in its normal vertical position even when the induction pipe M is turned through an angle of 180°.

Projecting from the walls 1 of the induction pipe is a bracket 2 to which the outer side of the float chamber G is rotatably mounted. The float chamber G is provided on this side with a bearing 8 into which projects one end of a sleeve 7, which forms a pivot for said float chamber, and to the outer end of which the fuel supply conduit is connected. This sleeve 7 is screwed tightly into the bracket 2 concentric with the axis C—D of the axle 3, and within said sleeve is a valve needle 9 to the outer end of which the lever 10 of the float S is rotatably mounted.

Owing to the provision of the pendulum weight 6 and to the fact that the float chamber is rotatable about the axis C—D, said float chamber always remains in its normal vertical position when the induction pipe of the engine assumes any of the positions shown in Fig. 1 to 4 during the flight of an aircraft provided with a carburetor according to the invention, consequently the fuel in the float chamber is always maintained at the normal level A—B and the nozzles are normally supplied with fuel.

It will be clearly understood that the present invention may be applied to forms of carburetor other than that illustrated.

It may be desirable in certain circumstances, for the rotatable float chamber G to be fixed in certain inclined positions relative to the induction pipe M, for example when an aircraft descends from a great height, or when a motor vehicle descends a long steep gradient, when, by inclining the float chamber G, the fuel inlet 12 leading to the nozzle chamber 5 can be kept free from fuel so that only air is drawn into the induction pipe thereby reducing the consumption of fuel.

The turning of the float chamber into such an inclined position and the fixing of said float chamber in such position can be effected mechanically by means of the device illustrated in Figs. 6 and 7. This device consists of a rod 15 mounted in a bearing 16 in the dash board 14 of the aircraft or other vehicle and provided with an easily accessible hand wheel 13, and pivotally connected at 21 to a lever 18 which has a fork part 17 at one end and is connected at the other end, to a suitable support 20, by means of a ball joint 19. The prongs of the fork part 17 extend on each side of the arm carrying the pendulum weight 6 so that by rotating the hand wheel 13 the pendulum and consequently the float chamber G, to which it is connected by the axle 3, can be moved to any adjustable inclined position relative to the induction pipe M.

By pulling the rod 15, by means of the hand wheel 13, in the direction of the arrow 20, the forked part 17 of the pivoted lever 18 can be moved out of engagement with the pendulum weight 6.

I claim:—

1. In an internal combustion engine and more particularly in an aircraft engine the combination, an induction pipe and a bracket arm cast thereto, a hollow axle crossing the induction pipe and rotatably held in bearings, said axle having outlet passages for the fuel mixture inside of the induction pipe and both ends projecting to the outside of said pipe, a pendulum weight rigidly fast to one end of the pipe and a carburetor attached to its other end between bracket arm and induction pipe, said carburetor comprising a float chamber with a float and a fuel nozzle chamber having its inlet at the bottom of the chamber, a sleeve arranged concentrically to said hollow axle and screwed fast into said bracket arm and formed at one end to receive a fuel supply conduit and at the other end as a bearing for the float chamber, and a valve needle concentrically held within said sleeve having its free end projecting into the float chamber to form a bearing for the float.

2. In an aircraft engine and in combination with the device according to claim 1, a blocking device for the float chamber, said device comprising a framing and a dash board of the engine a forked arm attached by a ball bearing to said framing and adapted to engage said pendulum weight with the fork and a rod provided with a knob held slidingly in the dash board and hinged to said forked arm.

OTTO BAUMGARTNER.